United States Patent
Lunardi et al.

(10) Patent No.: US 9,248,505 B2
(45) Date of Patent: Feb. 2, 2016

(54) BORING AND FACING HEAD

(71) Applicant: D'ANDREA S.p.A., Lainate (IT)

(72) Inventors: Lucio Lunardi, Garbagnate Milanese (IT); Ermanno D'Andrea, Saronno (IT)

(73) Assignee: D'Andrea S.p.A., Lainate (IT)

( * ) Notice: Subject to any disclaimer, the term of this patent is extended or adjusted under 35 U.S.C. 154(b) by 0 days.

(21) Appl. No.: 14/331,256

(22) Filed: Jul. 15, 2014

(65) Prior Publication Data

US 2015/0020654 A1    Jan. 22, 2015

(30) Foreign Application Priority Data

Jul. 18, 2013   (IT) .............................. MI2013A1205

(51) Int. Cl.
*B23B 29/034* (2006.01)

(52) U.S. Cl.
CPC ..... *B23B 29/03471* (2013.01); *B23B 29/03439* (2013.01); *B23B 2229/16* (2013.01); *Y10T 82/12* (2015.01); *Y10T 82/125* (2015.01); *Y10T 82/2512* (2015.01); *Y10T 408/8598* (2015.01)

(58) Field of Classification Search
CPC ...................... Y10T 408/858; Y10T 408/8598; Y10T 82/12; Y10T 82/125; Y10T 82/2512; Y10T 82/2529; B23B 3/26; B23B 29/034; B23B 29/03435; B23B 29/03439
USPC ............... 82/1.2, 1.4, 123, 131; 408/153, 181
See application file for complete search history.

(56) References Cited

U.S. PATENT DOCUMENTS

| | | | | |
|---|---|---|---|---|
| 2,093,743 | A * | 9/1937 | Steiner | 279/6 |
| 2,383,753 | A * | 8/1945 | Wallace, Sr. | 82/131 |
| 2,831,386 | A * | 4/1958 | Woytych | 82/131 |
| 2,926,548 | A * | 3/1960 | D Andrea | 74/600 |
| 3,169,416 | A * | 2/1965 | Carlson et al. | 408/1 R |
| 3,237,486 | A * | 3/1966 | Gilbert et al. | 408/3 |
| 4,250,778 | A * | 2/1981 | Christoph | 82/128 |
| 4,411,178 | A * | 10/1983 | Wachs et al. | 82/113 |
| 4,509,236 | A * | 4/1985 | Morita et al. | 29/26 A |
| 4,599,769 | A * | 7/1986 | Latzko et al. | 29/26 A |
| 4,869,127 | A * | 9/1989 | Ariyoshi | 475/1 |
| 5,197,361 | A * | 3/1993 | Carrier et al. | 82/1.2 |

FOREIGN PATENT DOCUMENTS

DE   1777296 A1 *  9/1971
JP   55106702 A  *  8/1980

* cited by examiner

*Primary Examiner* — Daniel Howell
*Assistant Examiner* — Nicole N Ramos
(74) *Attorney, Agent, or Firm* — Kirschstein, Israel, Schiffmiller & Pieroni, P.C.

(57) ABSTRACT

A boring and facing head, rotatively driven by the mandrel of a machine tool, with a turning tool mounted on a mounting slide, which may be controllably driven transversely of the axis (X) of the head body by a threaded shaft (12) operatively connected to a cylinder body (11), integral with a mandrel (4) and rotatably housing a ring gear (17), operatively connected to a gear wheel (19), driven by a controllable motor (8) and wherein the ring gear (17) comprises a circumferential tooth arrangement engaging with a gear wheel (52), integral with the driving shaft (12).

3 Claims, 4 Drawing Sheets

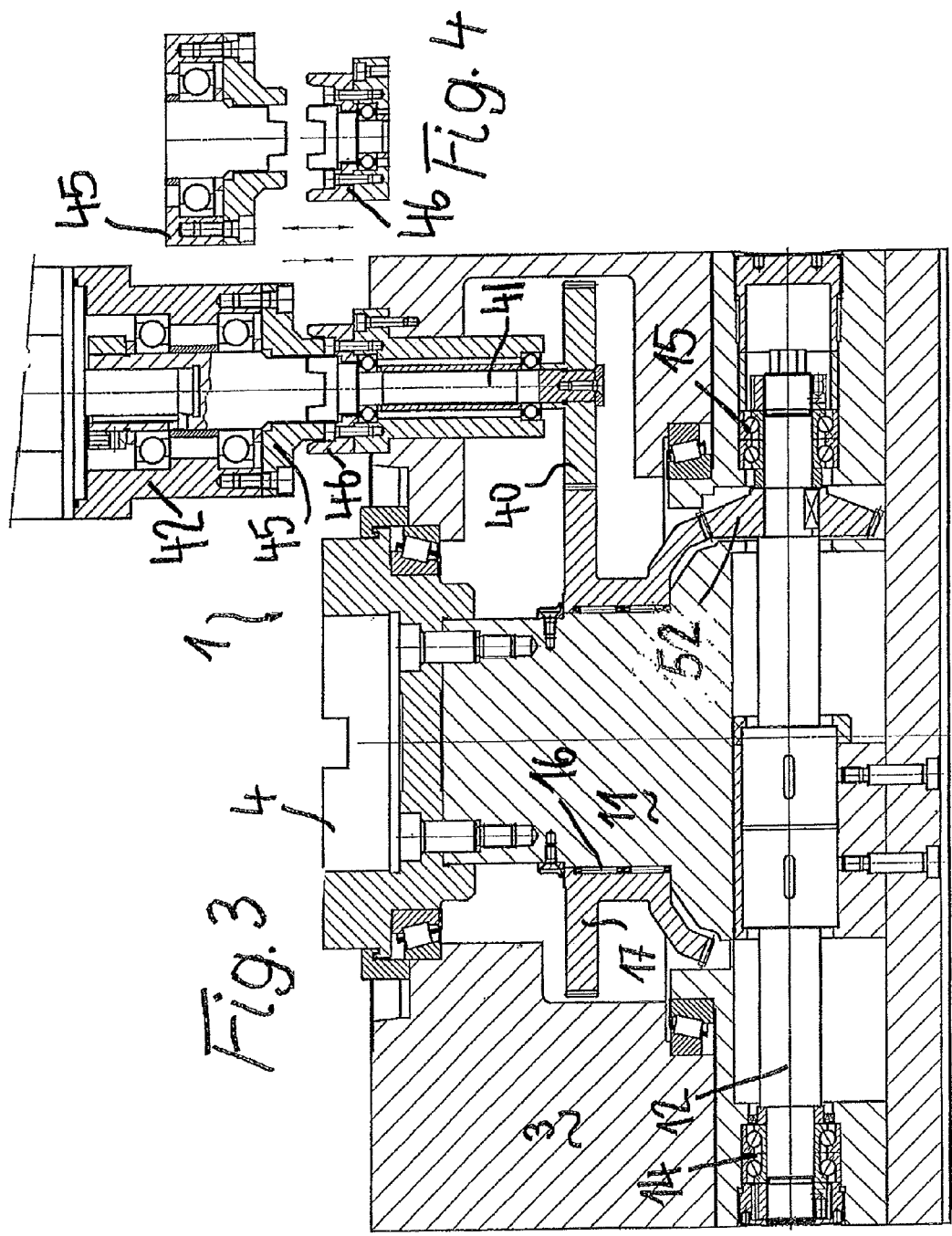

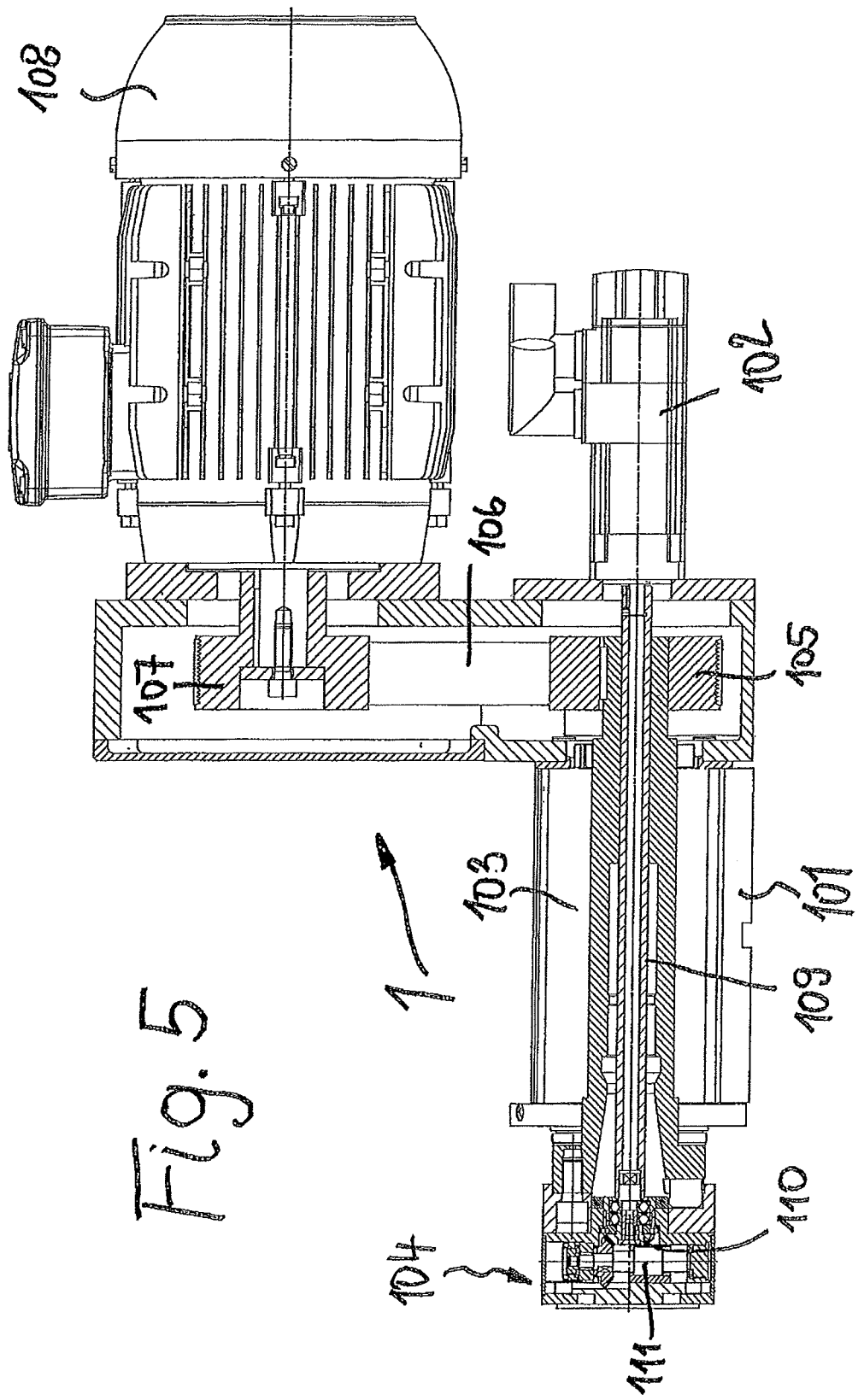

BORING AND FACING HEAD

BACKGROUND OF THE INVENTION

The present invention relates to a boring and facing head. As is known, such a head can be used in a machine tool and can be made by a numeric controlled system.

The boring and facing head being coupled, either manually or automatically, to a mandrel of a machine tool, such as a central working unit or a special machine, to perform many freely selectable turning, facing or boring operations, the workpiece being machined being held locally stationary.

In operation said head performs its chip removal operations by a turning tool, mounted on a mounting slide controllably driven transversely of an axis X of the machine tool mandrel.

Boring and facing heads are well known in the prior art thereby they do not require a further detailed disclosure.

However, since said heads comprise a comparatively complex epicycloidal mechanism for operatively driving the machining tool, the driving speed of the turning tool supporting slide is very low, even if modern machine tools would allow the machining tool supporting slide to be driven with a very high driving speed to drastically reduce the machine tool dead time and undesirable excessive heat generation, negatively affecting said head and its working accuracy.

SUMMARY OF THE INVENTION

Accordingly, the aim of the present invention is to overcome the above mentioned drawbacks, by providing a boring and facing head, rotatively driven by the mandrel of a machine tool, including a turning tool mounted on a mounting slide, which may be controllably driven transversely of an axis X of a head body by a threaded shaft, operatively connected to a ring gear, integral with the mandrel and rotatively housing a gear wheel, driven by a controllable motor and wherein the ring gear comprises a circumferential tooth arrangement engaging with a gear wheel integral with the driving shaft.

BRIEF DESCRIPTION OF THE DRAWINGS

Further advantages and characteristics of the invention will become more apparent hereinafter from the following disclosure, claims and sub-claims, as well as the accompanying drawings, where:

FIG. 3 shows the subject boring and facing head with a further tool driving mechanism;

FIG. 4 shows portions of the driving mechanism of FIG. 3, disengaged from the boring and facing head driving shaft; and FIG. 5 shows a further embodiment of the boring and facing head.

DESCRIPTION OF THE PREFERRED EMBODIMENTS

Figure 1:
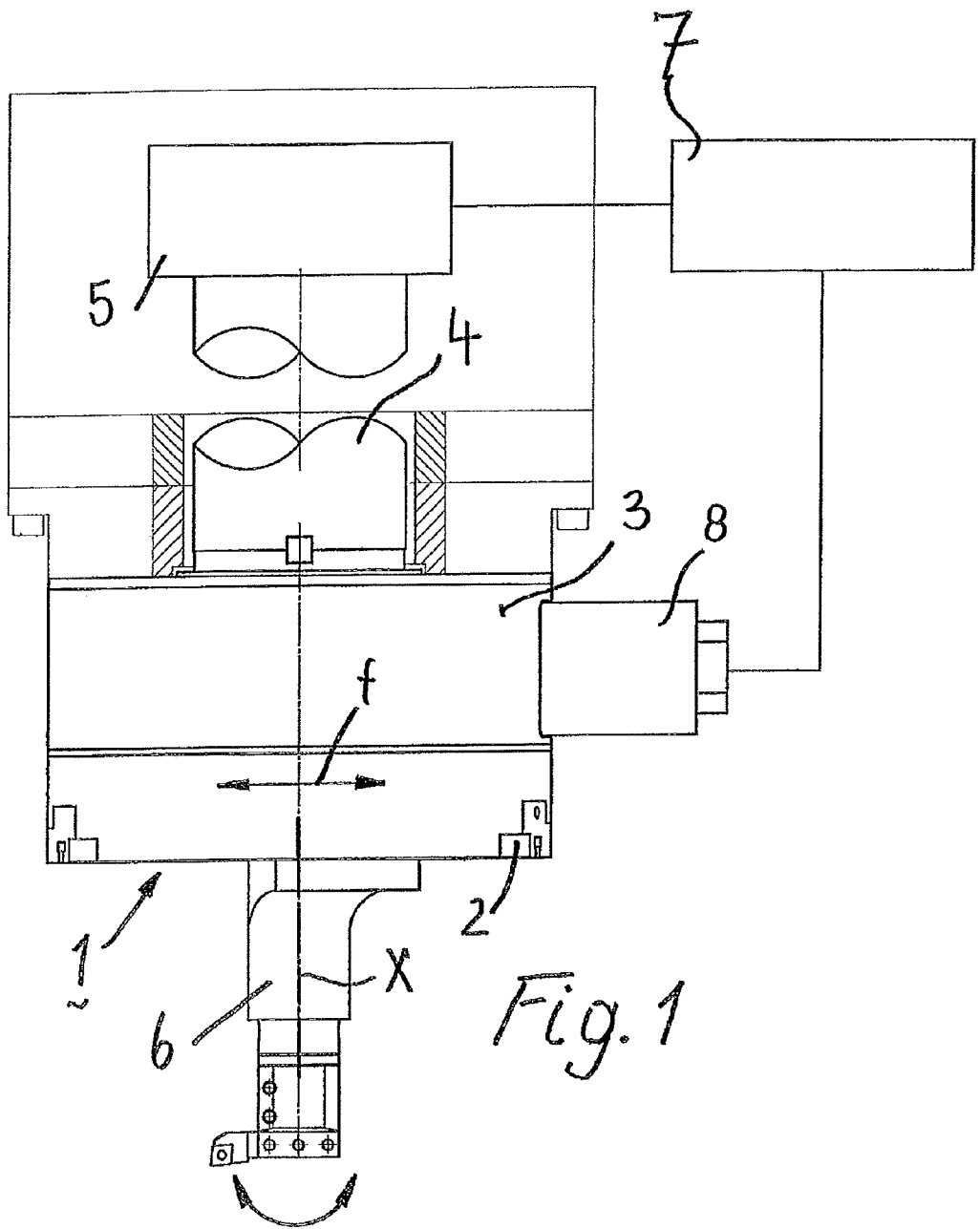
FIG. 1 is a schematic view showing a boring and facing head coupled to a mandrel of a machine tool, and with driving and numerical control means.

FIG. 1 shows a prior boring and facing head, which has been generally indicated by the reference number 1.

Said boring and facing head 1 comprises a bottom portion made as a well known driving slide 2 which may be driven (as shown by the arrow (f)), with respect to a fixed part 3 of the head.

By a known machine tool mandrel 4, driven by a respective driving motor 5 arranged in the machine tool, an operating tool 6 may be rotatively driven about an axis X.

For rotatively driving the machine tool mandrel 4, said machine tool controllable motor 5 is operatively coupled to a machine tool numerical control system 7.

To a further tool 6 driving mechanism, which will be disclosed hereinafter, arranged in the fixed part or body 3 of the head 1, is operatively connected a further driving motor 8, integral with the fixed part or body 3 of the head 1 for operatively driving a plurality of gear wheels, or belt driven wheels or pulleys, arranged in the body 3, as it will be disclosed in a more detailed manner hereinafter.

The motor 8 is also controlled by the machine tool numerical control system 7.

Figure 2:
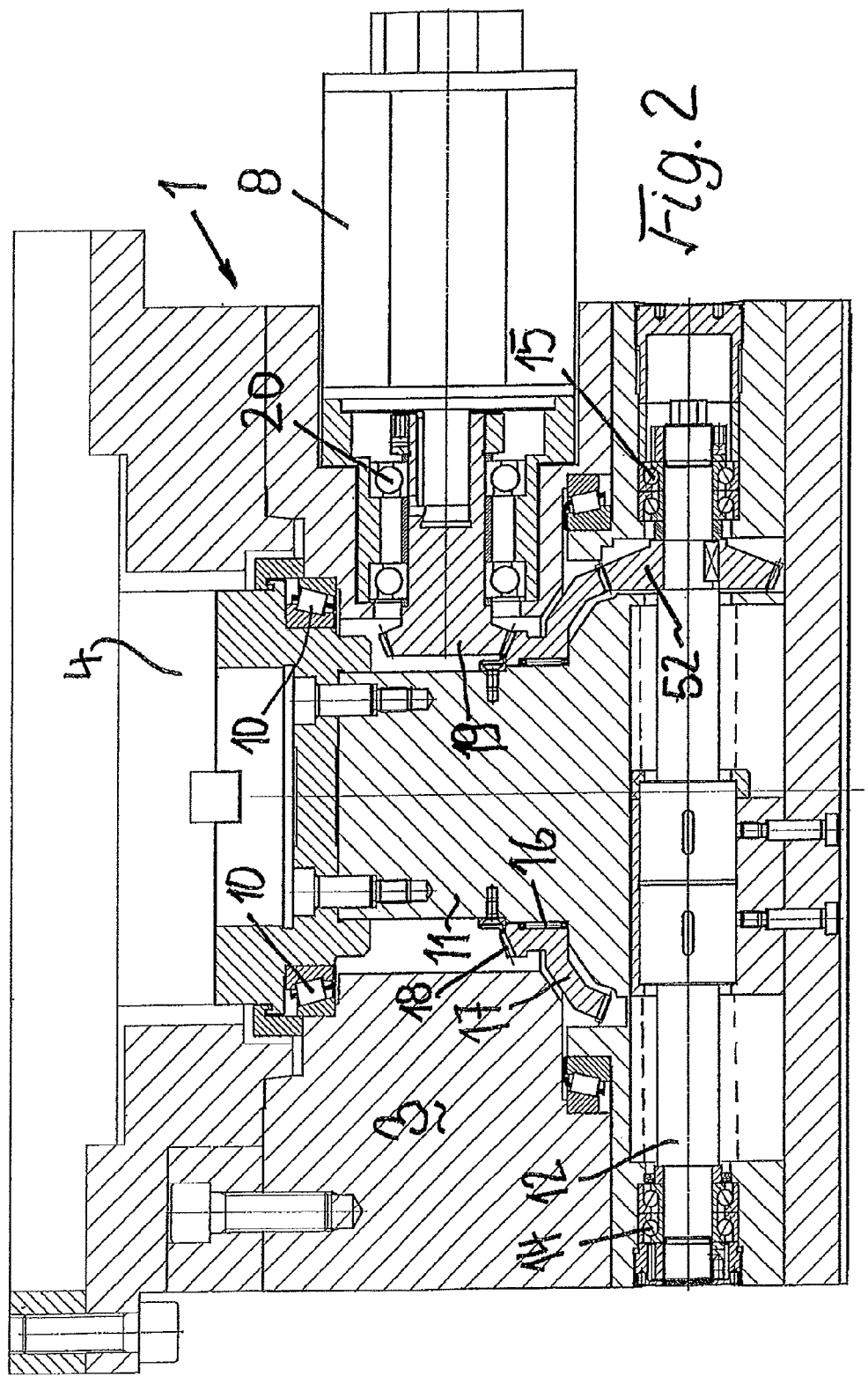
FIG. 2 is a cross-sectional view of the head according to the present invention, with a driving motor driven by a driving screw element.

FIG. 2 is a cross-sectional view of the boring and facing head 1 and shows the machine tool mandrel 4 coupled to the rotary part of the head I.

The fixed part or body 3 of the head 1 comprises a cylindric body 11, supported by supporting bearings 10 and operatively coupled to said mandrel 4. At the bottom part thereof, said cylindric body 11 is traversed by a threaded shaft 12 supported by respective supporting bearings 14 and 15.

In the cylindric body 11 is engaged, through further bearings 16, a ring gear 17, having a top toothed part 18 coupled to a bevel gear wheel 19 supported by further supporting bearings 20 and operatively connected to the motor 8 controlled through the machine tool numerical control system 7.

FIG. 3 shows the machining head 1, driven, as above disclosed, by the mandrel 4 of the machine tool, which comprises a fixed part 3 engaged with a cylindric body 11 which, through said bearings 16, engages said ring gear 17, driven through a respective gear wheel 40 integral with a driving shaft 41 operatively coupled to a further driving motor 42 also controlled by the above disclosed machine tool numerical control system 7.

As shown, the gear wheel 40 (FIG. 3) engages with the ring gear 17 which, in turn, is operatively connected to a further bevel gear wheel 52, integral with said threaded shaft 12, supported by the supporting bearings 14, 15, as previously disclosed.

As shown in FIG. 4, the front part of the driving shaft 42, comprises an end portion 45 forming a clutch arrangement, which may be connected to a connecting assembly 46, respectively engageable with and disengageable from said end portion 45.

The tool bearing slide driving motor comprises a shaft supporting a pinion directly engaging with a ring gear, centered on the rotary body and engaging with a further pinion in turn keyed on a ball recirculating worm screw, axially aligned with the slide driving direction and fixed to said slide. Thus, as the head rotary body is rotatively driven with the slide in a rest condition, said motor will be rotatively driven with such a rotary speed that said ring gear will in turn be driven with a same rotary speed as that of the rotary body.

Thus, in a reference system integral with the rotary body rotary axis, the ring gear will be driven by a related driving speed corresponding to zero and the pinion and endless screw system will not be rotatively driven.

Upon having synchronized the motor with the machine tool mandrel rpm's, it will be sufficient to either increase or decrease the motor rpm's to cause said slide to be either positively or negatively displaced.

The main feature of the present invention is the synchronism concept applied to a boring and facing head mounted on a mandrel of a machine tool, which synchronism would be indispensable for driving a cross displacement of the tool mounting slide.

Thus, the head according to the present invention does not comprise a differential or epicycloidal system thereby it is indispensable to provide a synchronism between the motor 8 rotary speed and the mandrel 4 rpm's.

During a simultaneous synchronous rotation of the motor 8 with the mandrel 4, the increasing or decreasing of the motor 8 rpm's will provide, through the gear wheel 19, a corresponding rotary movement of the ring gear 17 with respect to the body 11 with a consequent movement of the gear wheel 52 and threaded shaft 12 and a related cross displacement of the tool mounting slide either in a positive or negative direction.

In this connection it should be pointed out that the synchronism of the two rotary axes is directly controlled by the machine tool numerical control system 7.

FIG. 5 shows a boring and facing head, generally indicated by the reference number 1, and having a modified structural construction. As is shown herein, the tool mounting slide 101 is operatively driven by a driving motor 102 arranged on the rear of the mandrel assembly 103. The boring and facing head 104 is operatively coupled to the mandrel, which rotatively drives said head 104 through a driving gear wheel 105 in turn driven by a band 106 operatively connected to a wheel 107 in turn operatively coupled to a shaft of a driving motor 108.

Said head 104 is controllably driven by said motor 102 through a driving shaft 109 operatively coupled to the head 104 driveshaft, thereby rotatively driving a pair of bevel wheels 110 to in turn operatively drive the screw 11, thereby causing said slide 104 to be radially fed. The slide movement being controlled by synchronizing the rotation of the motor 102 with that of the motor 108.

To provide a perfect synchronization of the machine tool motor 5 movements and the head motor 8, both said motor 5 and motor 8 are synchronously controlled by said machine tool numerical control system 7.

The invention claimed is:

1. A boring and facing head coupled to a mandrel of a machine tool for rotating a turning tool about a tool axis, comprising:
    a slide movable along a transverse axis that is generally perpendicular to the tool axis, the slide having the turning tool mounted thereon for movement along the transverse axis; and
    a drive assembly for jointly moving the slide and the turning tool, the drive assembly including a drive motor having a motor shaft extending along a shaft axis that is generally parallel to the transverse axis, a first gear wheel mounted on the motor shaft for rotation about the shaft axis, a ring gear in meshing engagement with the first gear wheel for rotation about the tool axis, a threaded shaft extending along the transverse axis, and a second gear wheel fixedly mounted on the threaded shaft and being in meshing engagement with the ring gear for turning the threaded shaft about the transverse axis.

2. The boring and facing head of claim 1, and a body having a cylindrical portion extending through the ring gear along the tool axis, and a transverse passage in which the threaded shaft is received.

3. The boring and facing head of claim 1, and a tool motor for rotating the turning tool, and a controller operatively connected to both the tool motor and the drive motor for synchronizing the rotation and the sliding movement of the turning tool.

* * * * *